US007957517B2

(12) United States Patent
Ricciardi et al.

(10) Patent No.: US 7,957,517 B2
(45) Date of Patent: Jun. 7, 2011

(54) METHOD AND APPARATUS FOR PROVIDING INTERNET PROTOCOL CALL TRANSFER IN COMMUNICATION NETWORKS (75) Inventors: Dominic M. Ricciardi, Bridgewater, NJ (US); Silvano A. Brewster, Aberdeen, NJ (US); Kevin R. Honig, Manalapan, NJ (US); James Ibezim, Wayside, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1591 days.

(21) Appl. No.: 11/213,054

(22) Filed: Aug. 26, 2005

(65) Prior Publication Data
US 2007/0047529 A1 Mar. 1, 2007

(51) Int. Cl.
*H04M 3/58* (2006.01)
*H04L 12/66* (2006.01)

(52) U.S. Cl. ............ 379/212.01; 370/356; 370/395.5; 370/401; 455/417

(58) Field of Classification Search ............. 455/417; 709/250, 232, 238, 242; 379/212.01, 211.01; 370/352, 355, 356, 389, 395.5, 401; 719/318
See application file for complete search history.

(56) References Cited

U.S. PATENT DOCUMENTS

| 6,958,994 | B2 * | 10/2005 | Zhakov et al. | 370/352 |
| 7,006,455 | B1 * | 2/2006 | Fandrianto et al. | 370/260 |
| 7,280,530 | B2 * | 10/2007 | Chang et al. | 370/352 |
| 2002/0111156 | A1 * | 8/2002 | Roeder | 455/417 |
| 2005/0021872 | A1 * | 1/2005 | Poustchi et al. | 709/250 |

FOREIGN PATENT DOCUMENTS
WO  WO-03107575 A2  12/2003

OTHER PUBLICATIONS

EP Search Report for EP 06119454 dated Nov. 3, 2006.
R. Sparks, A. Johnston, D. Petrie, "Session Initiation Protocol Call Control—Transfer", IETF Standard-Working-Draft, Internet Engineering Task Force, IETF, CH, vol. sipping, No. 3, Oct. 21, 2004.

* cited by examiner

*Primary Examiner* — Harry S Hong (57) ABSTRACT

A method and apparatus for enabling a network provider, in concert with IP technology and protocols, to provide the ability to offer a simple pre-answer or post-answer call redirection, such as call transfer, to customers with IP endpoints is disclosed. The present invention allows call transfers to be initiated from an IP endpoint but processed in the packet network, e.g., the VoIP network instead of being processed by the endpoint. When a redirecting party (RP) receives a call from a calling party (CP), the RP simply sends a VoIP signaling message to the network to initiate a call transfer to redirect the call from the CP to a TP instead and the network will complete the call transfer on behalf of the RP.

20 Claims, 11 Drawing Sheets

METHOD AND APPARATUS FOR PROVIDING INTERNET PROTOCOL CALL TRANSFER IN COMMUNICATION NETWORKS

The present invention relates generally to communication networks and, more particularly, to a method and apparatus for providing Internet Protocol (IP) Call Transfer in communication networks, e.g. packet networks such as Voice over Internet Protocol (VoIP) networks.

BACKGROUND OF THE INVENTION

Call transfer is a common call feature that is used by subscribers of telephone services. In a VoIP network, call transfers can be supported by customer endpoint devices without the VoIP network being involved. In this customer premise based call transfer scenario, the VoIP network is merely serving as a pure IP packet transport network to route packets from one endpoint to another endpoint. All call transfer related signaling functions are carried out between VoIP endpoints directly with no involvement with the public VoIP network. This customer premise based call transfer approach also introduces complexity in managing VoIP network functions by owners of these VoIP endpoints. Moreover, this approach cannot provide the overall reliability and extensibility that a public VoIP network can offer.

Therefore, a need exists for a method and apparatus for network based IP call transfer in a packet network, e.g., a VoIP network.

SUMMARY OF THE INVENTION

In one embodiment, the present invention enables a network provider, in concert with IP technology and protocols, to provide the ability to offer a simple pre-answer or post-answer call redirection, such as call transfer, capability to customers with IP endpoints. The present invention allows call transfers to be initiated from an IP endpoint but processed in the packet network, e.g., the VoIP network, instead of being processed by the endpoint. When a redirecting party (RP) receives a call from a calling party (CP), the RP simply sends a signaling message, e.g., a VoIP signaling message, to the network to initiate a call transfer to redirect the call from the CP to a target party (TP) instead and the network will complete the call transfer on behalf of the RP.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
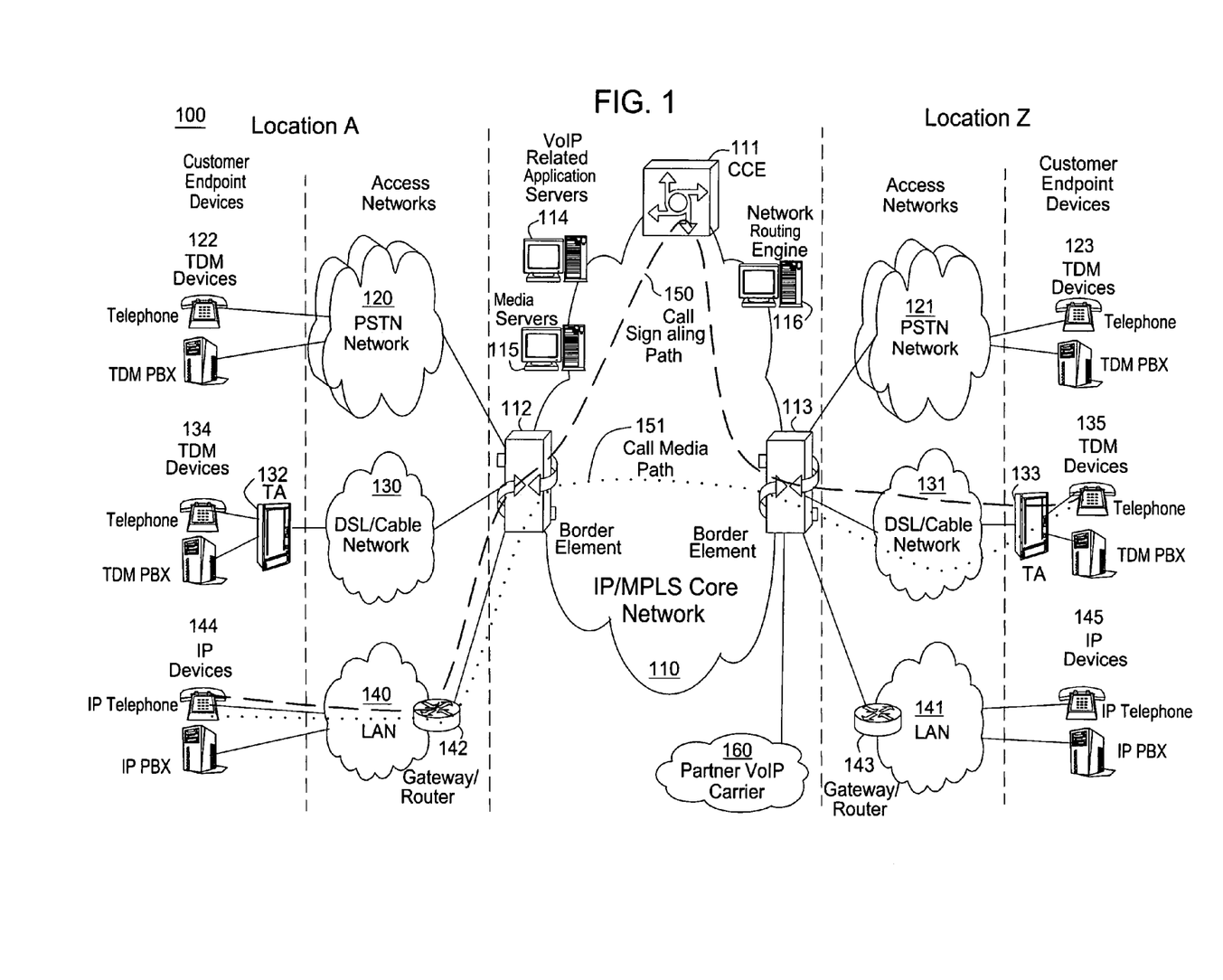
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Call transfer is a common call feature that is used by subscribers of telephone services. In a packet network, e.g., a VoIP network, call transfers can be supported by customer endpoint devices without the VoIP network being involved. In this customer premise based call transfer scenario, the VoIP network is merely serving as a pure IP packet transport network to route packets from one endpoint to another endpoint. All call transfer related signaling functions are carried out between VoIP endpoints directly with no involvement with the public VoIP network. This customer premise based call transfer approach also introduces complexity in managing VoIP network functions by owners of these VoIP endpoints. Moreover, this approach cannot provide the overall reliability and extensibility that a public VoIP network can offer.

To address this need, the present invention enables a network provider, in concert with IP technology and protocols, to provide the ability to offer a simple pre-answer or post-answer call redirection, such as call transfer, to customers with IP endpoints. The present invention allows call transfers to be initiated from an IP endpoint but processed in the VoIP network instead of being processed by the endpoint. When a redirecting party (RP) receives a call from a calling party (CP), the RP simply sends a VoIP signaling message to the network to initiate a call transfer to redirect the call from the CP to a target party (TP) instead and the network will complete the call transfer on behalf of the RP.

It should be noted that although the present invention is described below in the context of SIP, the present invention is not so limited. Namely any other Internet Protocol (IP) signal protocol is contemplated by the present invention.

The present method of providing call transfer capability in a communication network is described using FIGS. 2-9 below. As such, the reader is encouraged to refer simultaneously to these figures to gain understanding of the present invention.

Figure 2:
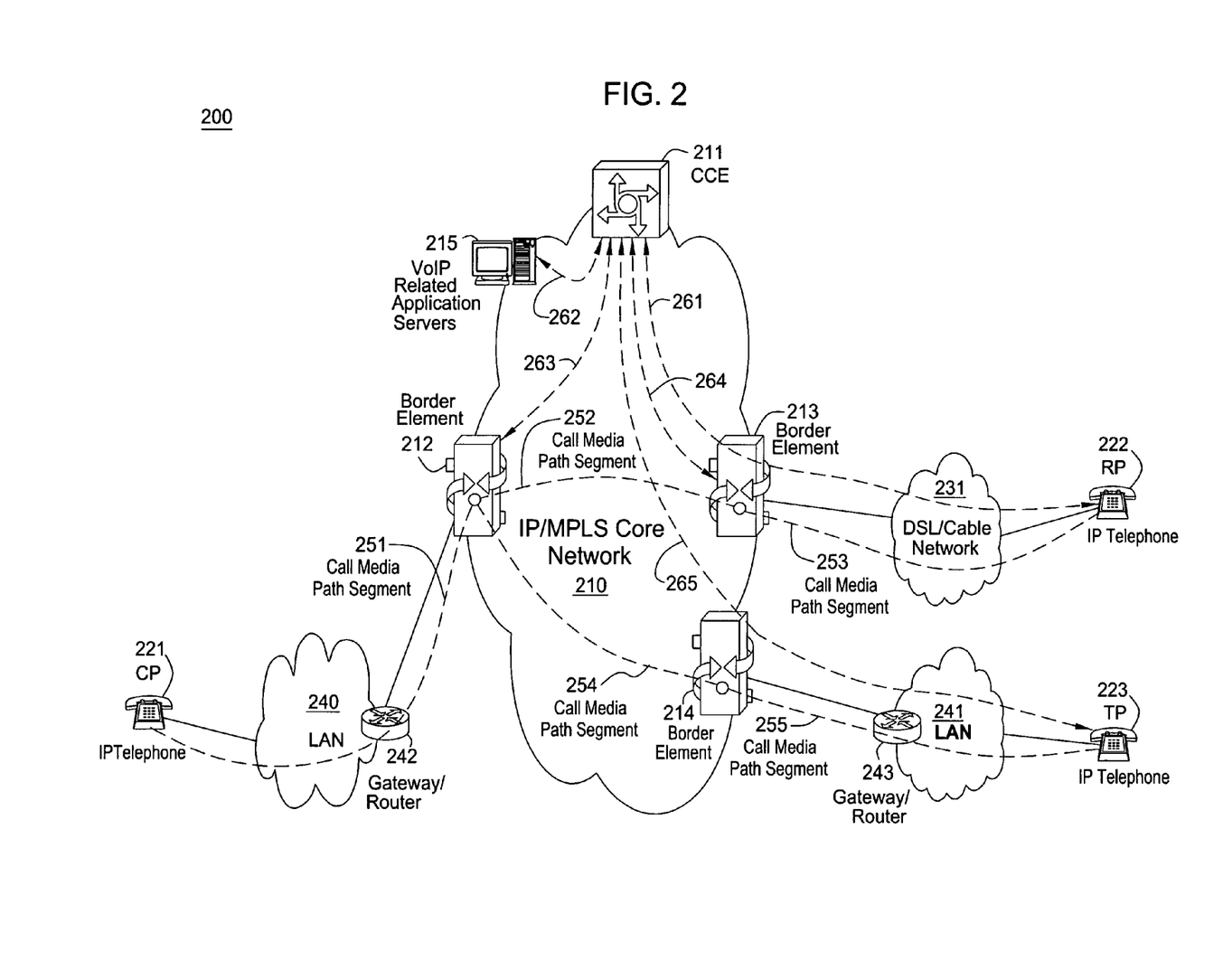
FIG. 2 illustrates an example of a post-answer call transfer of the present invention.

FIG. 2 illustrates an example of a post-answer call transfer of the present invention. In FIG. 2, an ongoing call has been established between Calling Party (CP) 221 and Redirecting Party (RP) 222. The existing call media path comprises call media path segment 251, 252, and 253, traversing BEs 212 and 213. Call media path segment 251 extends between CP 221 and BE 212; call media path segment 252 extends between BE 212 and BE 213; and call media path segment 253 extends between BE 213 and RP 222. During the call, RP 222 decides to transfer the ongoing call to a Target Party (TP) 223. RP 222 then sends a SIP REFER signaling message with the TP phone number via BE 213 to CCE 211 using signaling path 261. CCE 211 then communicates with Application Server (AS) 215 using signaling path 262 to verify RP 222 has subscribed to the call transfer feature and is allowed to perform the requested transfer. AS 215 then sends a SIP INVITE message to CCE 211 using signaling path 262 to request call media path segment 251 to be placed on hold. CCE 211 then forwards the SIP INVITE message to BE 212 using signaling path 263. Upon receiving the signaling message, BE 212 will place call media path segment 251 on hold. Similarly, AS 215 sends a SIP INVITE message to CCE 211 using signaling path 262 to request call media path segment 253 to be placed on hold. CCE 211 then forwards the SIP INVITE message to BE 213 using signaling path 264. Upon receiving the signaling message, BE 213 will place call media path segment 253 on hold. Then, AS 215 sends a SIP REFER message with TP 223 phone number to CCE 211 using signaling path 262 to request call transfer of the existing call to be redirected from CP 221 to TP 223 instead. CCE 211 then forwards the SIP REFER message with TP 223 phone number to BE 212 using signaling path 263. In the mean time, AS 215 sends a SIP BYE message, which is forwarded via CCE 211, to BE 213 using signaling path 262 and 264 to disconnect the currently on hold call media path segment 253 as well as call media path segment 252. After the SIP REFER message has been processed, BE 212 sends a SIP INVITE message to CCE 211 using signaling path 263 to attempt to connect to TP 223. CCE 211 determines that BE 214 will be used to complete the call and routes the SIP INVITE via BE 214 to TP 223 using signaling path 265. If TP 223 answers the incoming call, the redirected call will be completed with a new call media path comprising media path segment 251, 254, and 255, via BEs 212 and 214. This basically completes the general post-answer call transfer example. Note that the called party, RP, is the redirecting party in the example. For those who are skilled in the art, the calling party, CP, can also act as a redirecting party using a similar method as described previously to initiate a call transfer. In general, for a post-answer call transfer, there is no limitation whether the calling party or the called party is the redirecting party who initiates a call transfer.

Figure 3:
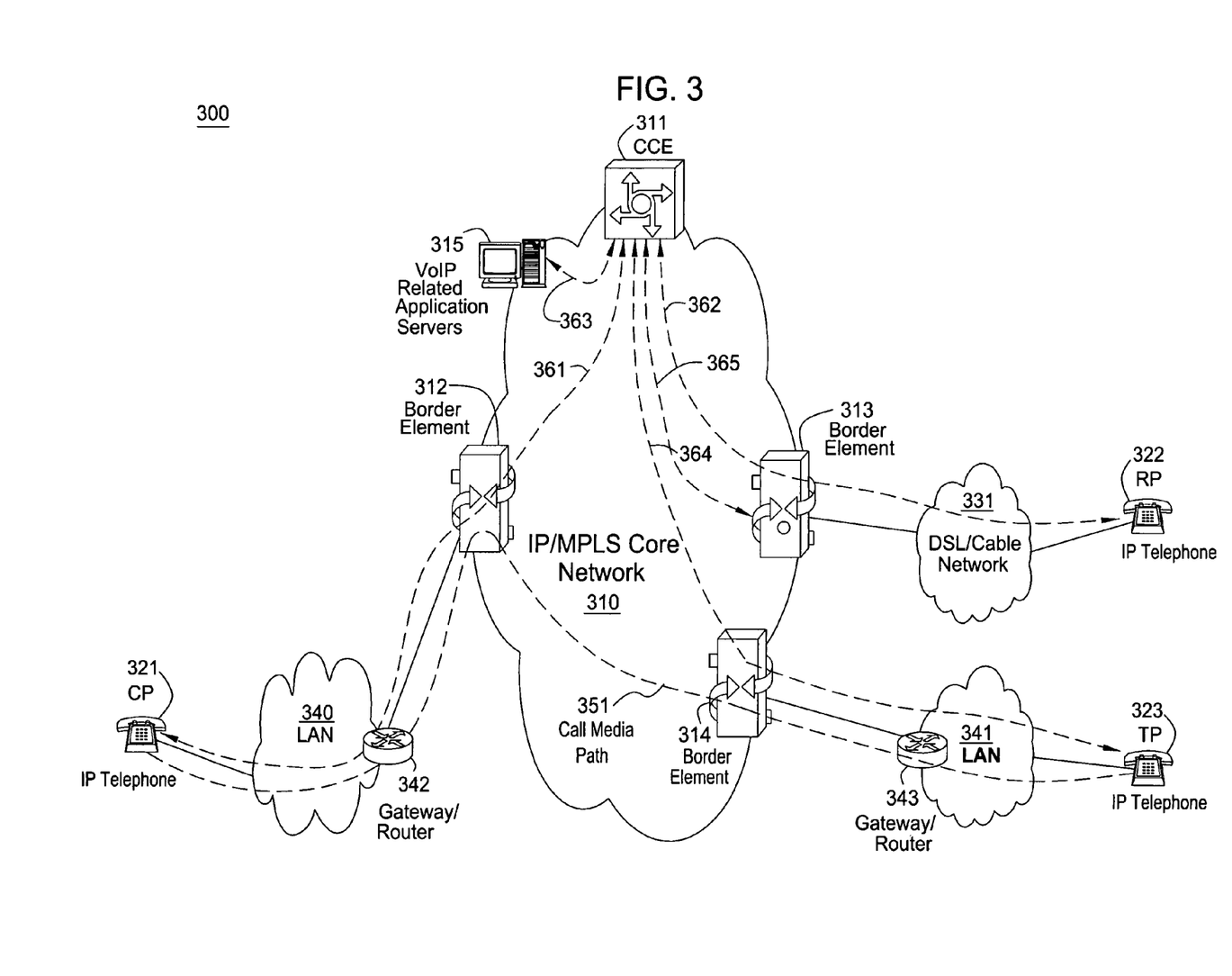
FIG. 3 illustrates an example of a pre-answer call transfer of the present invention.

FIG. 3 illustrates an example of a pre-answer call transfer of the present invention. In FIG. 3, CP 321 places a call to RP 322 by sending a SIP INVITE message (e.g., a call setup request) via BE 312 to CCE 311 using signaling path 361. CCE 311 forwards the SIP INVITE message to RP 322 via BE 313 using signaling path 362. However, in one embodiment, RP 322 can redirect all calls to TP 323; in another embodiment, RP 322 can redirect calls on a call by call basis. Upon receiving the incoming call, RP 322 sends a SIP REFER message (e.g., a transfer request) with the phone number of TP 323 back to CCE 311 via BE 313 using signaling path 362. CCE 311 then sends the REFER message to AS 315 using signaling path 363. AS 315 then sends a SIP INVITE message with CP 321 as the originating party and TP 323 as the called party to CCE 311 using signaling path 363. CCE 311 determines that TP 323 is served by BE 314 and CCE 311 forwards the SIP INVITE message to TP 323 via BE 314 using signaling path 364. CCE 311 also sends a SIP INVITE message with TP 323 as the originating party to CP 321 via BE 312 using signaling path 361. In the mean time, AS 315 sends a SIP CANCEL message, which is forwarded via CCE 311, to BE 313 using signaling path 363 and 365 to cancel the call originally destined to RP 322. Once TP 323 and CP 321 accept the incoming SIP INVITE messages, call media path 351 via BEs 312 and 314 will be established. This basically completes the general pre-answer call transfer example.

Figure 4:
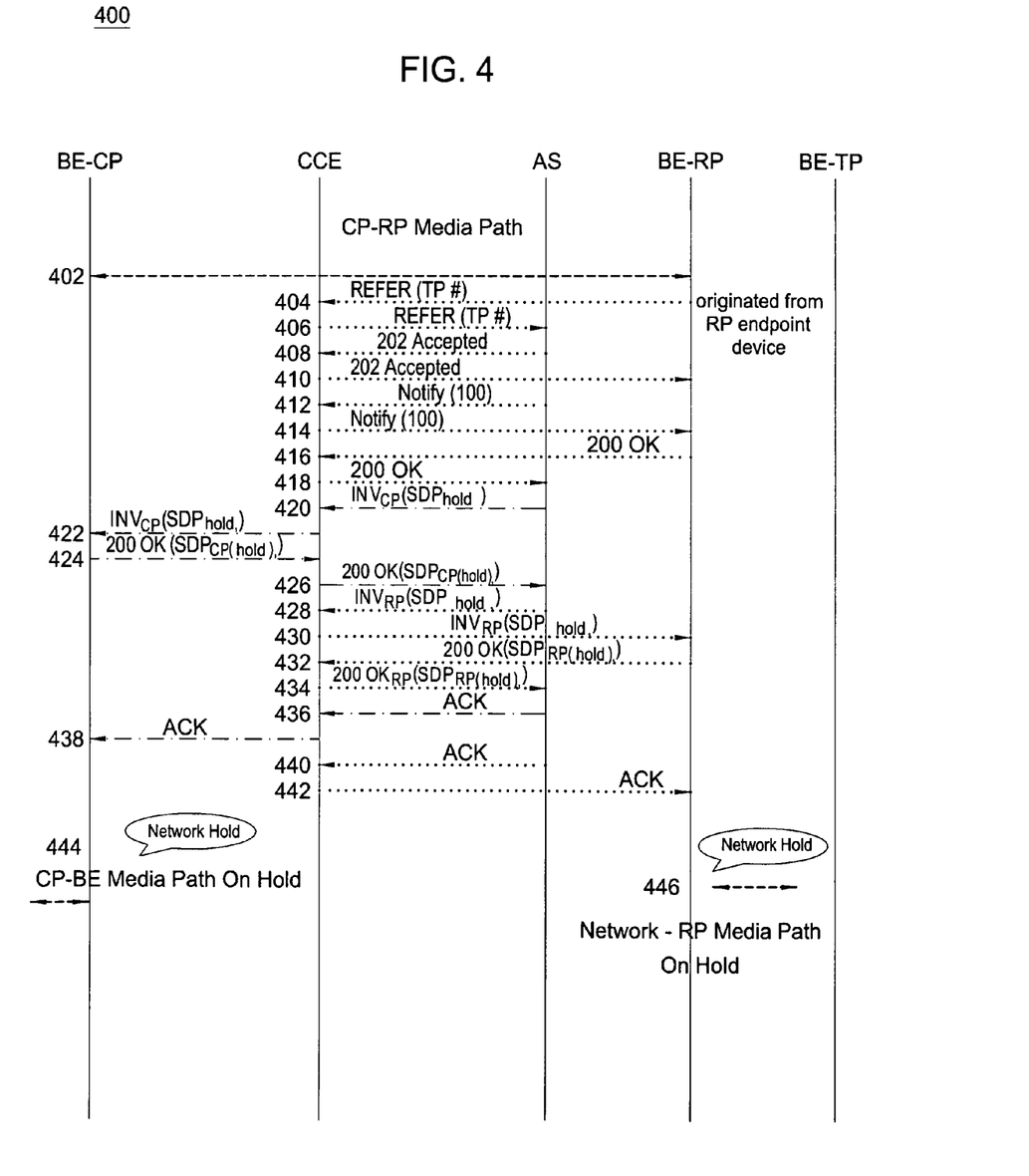
FIG. 4 illustrates the detailed SIP signaling message flows within the VoIP network from when RP requests a post-answer call transfer to when the access call media path segments are placed on hold of the present invention.

FIG. 4 illustrates the detailed SIP signaling message flow method 400 within the VoIP network from when RP requests a post-answer call transfer to when the access call media path segments are placed on hold of the present invention. In FIG. 4, 402 indicates that an existing call media path has already been established between the CP and the RP. Flow 404 to 418 show the signaling flows between CCE, AS, and BE-RP corresponding to the action of RP initiating a call transfer from CP to TP using a SIP REFER message with the TP phone number and the subsequent SIP signaling flows in response to the RP SIP REFER request. Flow 420 to 426 and flow 436 to 438 show the SIP signaling flows between AS, CCE, and the AS associated with CP (BE-CP) corresponding to the action of AS initiating a request to place the CP access call media path segment on hold. Similarly, flow 428 to 434 and flow 440 to 442 show the SIP signaling flows between AS, CCE, and the BE-RP corresponding to the action of AS initiating a request to place the RP access call media path segment on hold. In 444, the CP access call media path segment, from CP to BE-CP, has now been placed on hold. Similarly, in 446, the RP access call media path segment, from RP to BE-RP, has now been placed on hold.

Figure 5:
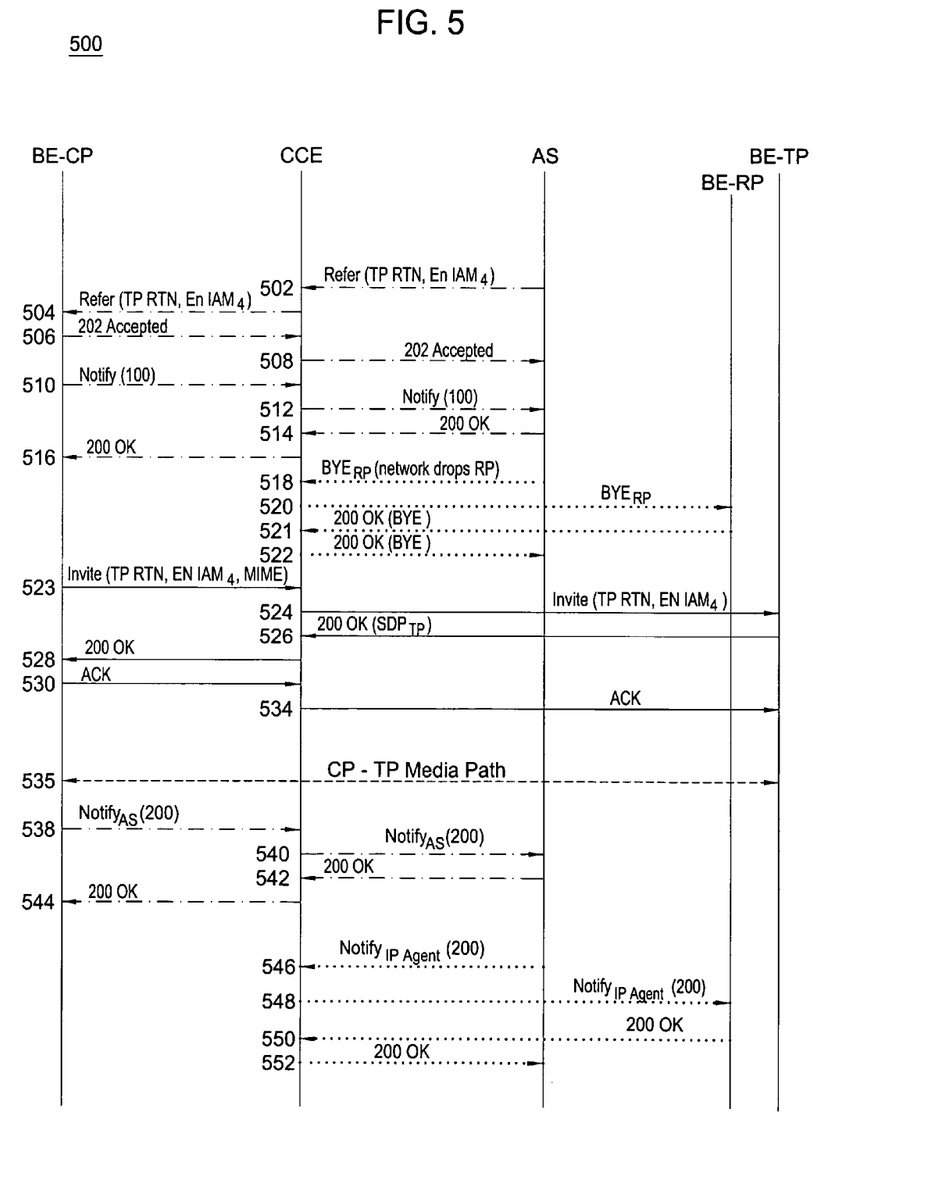
FIG. 5 illustrates the detailed SIP signaling flows within the VoIP network for completing a post-answer call transfer from CP to TP by RP in one embodiment of the present invention.

FIG. 5 illustrates the detailed SIP signaling flow method 500 within the VoIP network for completing a post-answer call transfer from CP to TP initiated by RP in one embodiment of the present invention. Signaling flows described in method 500 follow immediate after signaling flows described in method 400 have been executed. In FIG. 5, flow 502 to 516 and flow 538 to 544 show the SIP signaling flows between AS, CCE, and BE-CP corresponding to the action of RP sending a SIP REFER request with a TP phone number to redirect the existing call from CP to TP and the subsequent SIP signaling flows in response to the request. Flow 518 to 522 show the SIP signaling flows between AS, CCE, and BE-RP corresponding to the action of AS initiating to drop RP from the call using the SIP BYE message. Flow 523 to flow 534 show the SIP signaling flows between BE-CP, CCE, and the BE associated with TP (BE-TP) corresponding to the action of BE-CP initiating to establish a call media path between CP to TP. In 535, the call media path between CP and TP is consequently established. Flow 546 to 552 show the SIP signaling flows between BE-RP, CCE, and AS corresponding to the action of AS indicating to RP that the call transfer has been completed successfully between CP and TP.

Figure 6:
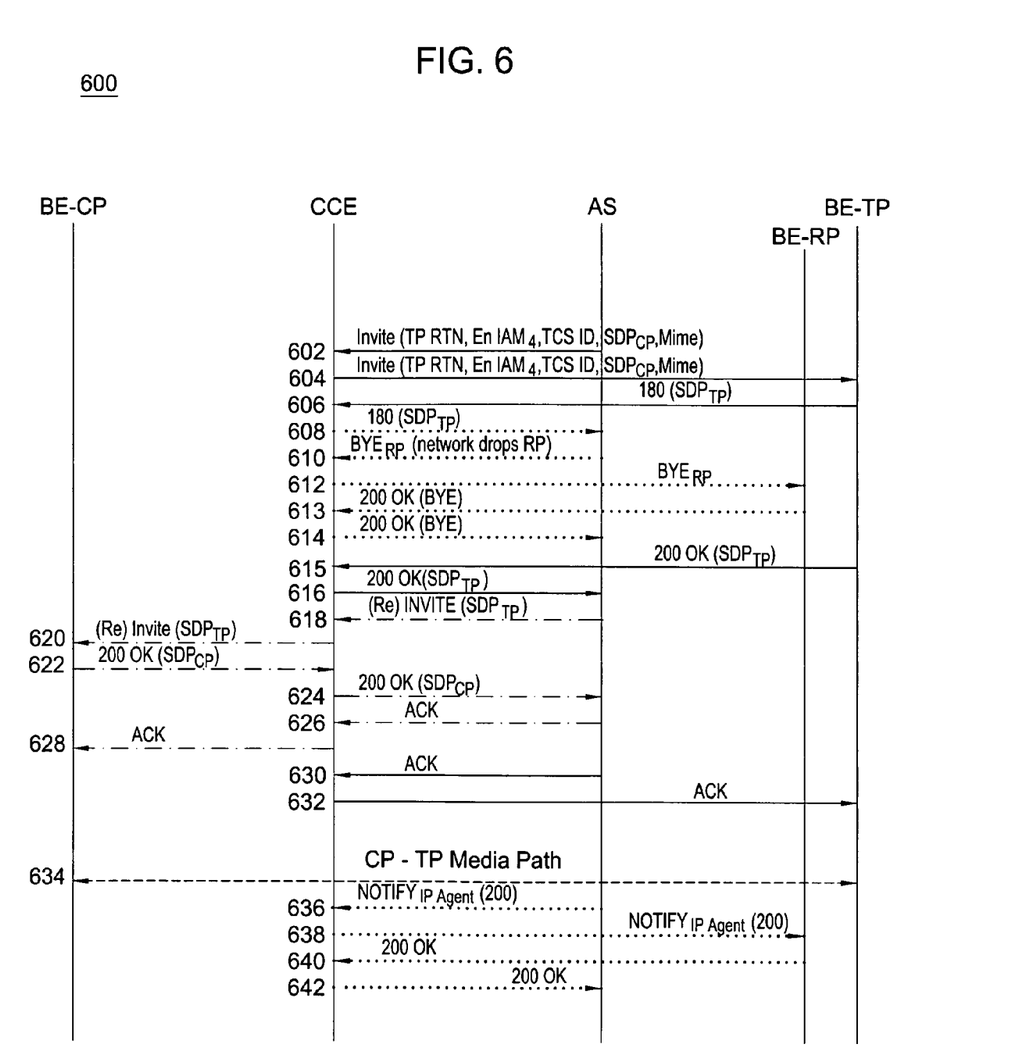
FIG. 6 illustrates the detailed SIP signaling flows within the VoIP network for completing a post-answer call transfer from CP to TP initiated by RP in another embodiment of the present invention.

FIG. 6 illustrates the detailed SIP signaling flow method 600 within the VoIP network for completing a post-answer call transfer from CP to TP initiated by RP in another embodiment of the present invention. Signaling flows described in method 600 follow immediate after signaling flows described in method 400 have been executed. In FIG. 6, flow 602 to 608, flow 615 to 616, and flow 630 to 632 show the SIP signaling flows between AS, CCE, and BE-TP corresponding to the action of AS initiating a call to TP. Flow 610 to 614 show the SIP signaling messages between AS, CCE, and BE-RP corresponding to the action of AS requesting to drop RP from the existing call. Flow 618 to 624 and flow 626 to 628 show the SIP signaling flows between AS, CCE, and BE-CP corresponding to the action of AS initiating a redirection of the existing call from CP to TP. In 634, the call transfer from CP to TP initiated by RP has been completed and the CP to TP call media path established. Flow 636 to 642 show the SIP signaling flows between BE-RP, CCE, and AS corresponding to the action of AS indicating to RP that the call transfer has been completed successfully between CP and TP.

Figure 7:
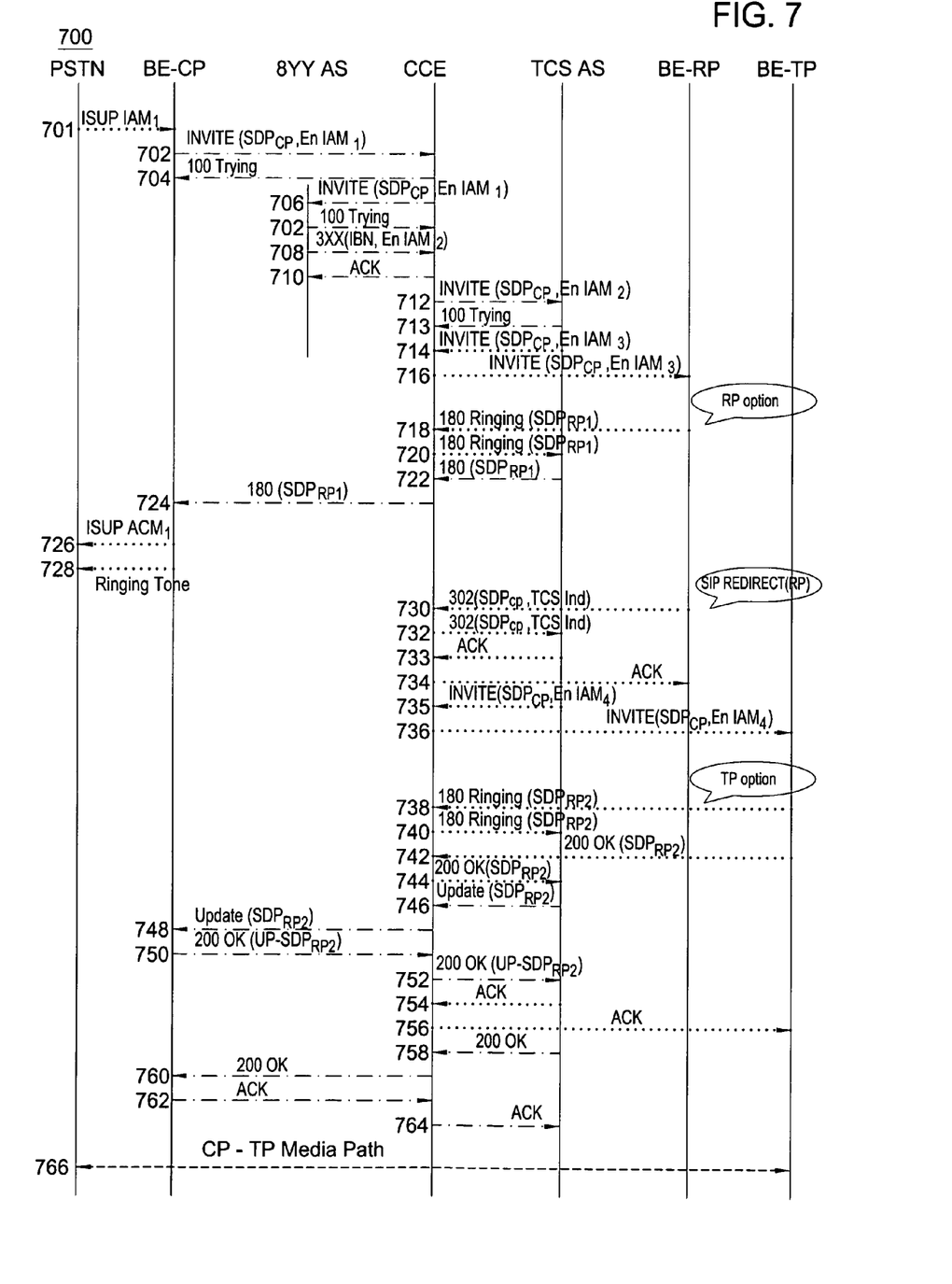
FIG. 7 illustrates the detailed SIP signaling flows within the VoIP network for completing pre-answer call transfer from CP to TP initiated by RP using SIP 302 response in one embodiment of the present invention.

FIG. 7 illustrates the detailed SIP signaling flow method 700 within the VoIP network for completing pre-answer call transfer from CP to TP initiated by RP using SIP 302 response in one embodiment of the present invention. The CP call originates in a TDM network and places a call to RP with a toll free number. Flow 701 to 713 show the SIP signaling flows between the PSTN that originates the CP call, BE-CP, 8YY AS that processes toll free number translation, CCE, TCS-AS that processes call transfer related functions corresponding to the action of CP calling RP with a toll free number and the subsequent SIP signaling flows in response to the CP call request. The 8YY AS is an AS that performs toll free number to the regular 10 digit North America Numbering Plan (NANP) phone number translation. The TCS-AS is an AS that performs call redirection related functions. Flow 714 to 720 show the signaling flows between TCS-AS, CCE, the BE associated with RP (BE-RP) corresponding to the action of TCS-AS initiating a call request using SIP INVITE message to RP and the subsequent SIP signaling flows in response to the AS INVITE message. Flow 718 to 728 show the signaling flows corresponding to the action of RP indicating that a ringing condition has been initiated at the RP. Flow 730 to 734 show the SIP signaling flows between BE-RP, CCE, and TCS-AS corresponding to the action of RP responding to the TCS-AS INVITE message with a SIP 302 response indicating RP has moved temporarily to a new number TP. Flow 735 to 744 and flow 754 to 756 show the signaling flows between TCS-AS, CCE, and the BE associated with TP (BE-TP) corresponding to the action of TCS-AS initiating a call to using SIP INVITE message to TP and the subsequent SIP signaling flows in response to the TCS-AS INVITE message. Flow 746 to 752 and flow 758 and 764 show the signaling messages between TCS-AS, CCE, and BE-CP corresponding to the action of TCS-AS redirecting the original CP call to TP instead of RP and the subsequent SIP signaling flows in response to the redirection. In 766, the CP to TP call transfer initiated by RP has been completed and the CP to TP call media path established.

Figure 8:
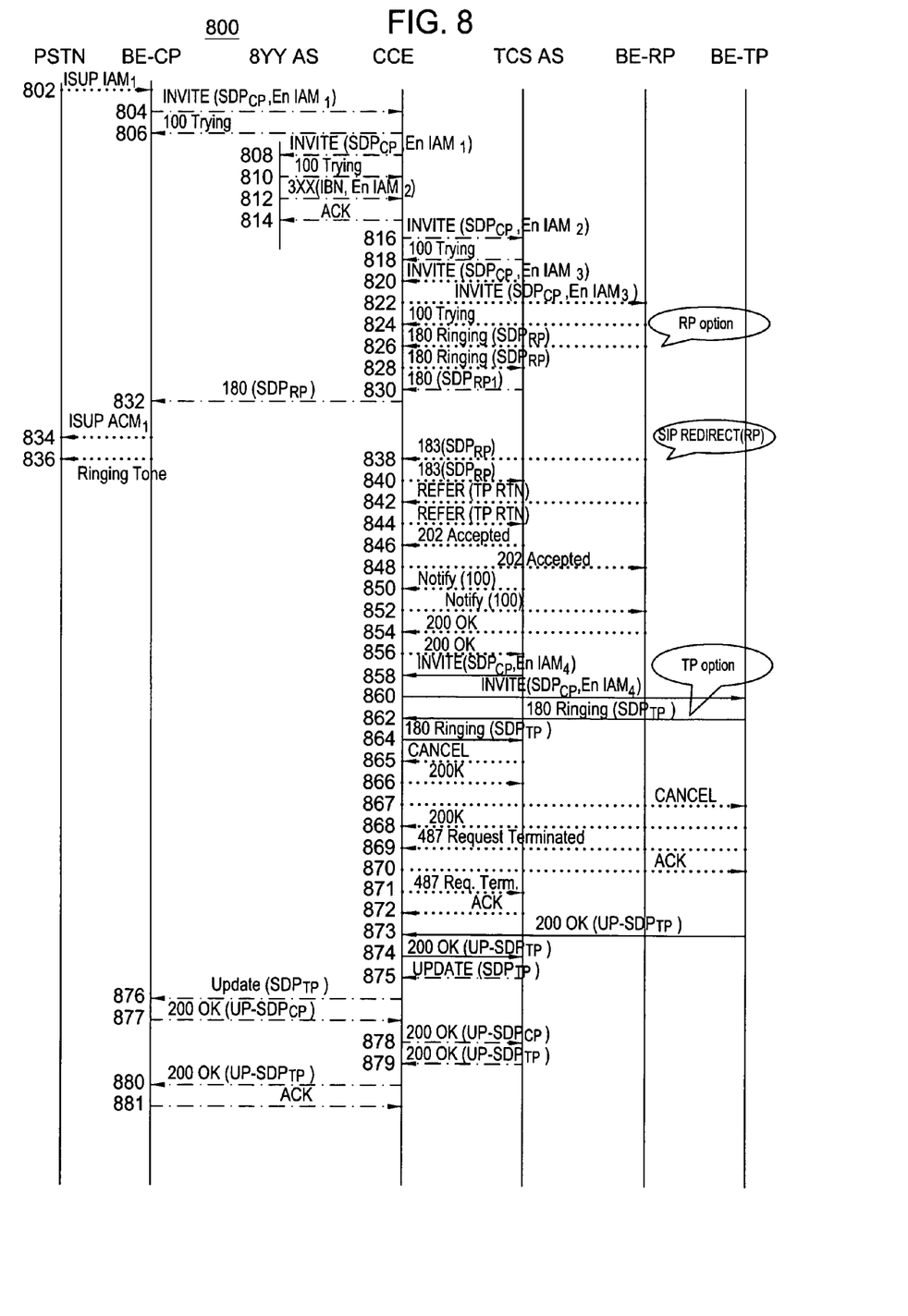
FIG. 8 illustrates the detailed SIP signaling flows within the VoIP network for completing pre-answer call transfer from CP to TP initiated by RP using SIP REFER message in a second embodiment of the present invention.

FIG. 8 illustrates the detailed SIP signaling flow method 800 within the VoIP network for completing pre-answer call transfer from CP to TP initiated by RP using SIP REFER message in a second embodiment of the present invention. The CP call originates in a TDM network and places a call to RP with a toll free number. Flow 802 to 818 show the SIP signaling flows between the PSTN that originates the CP call, BE-CP, 8YY AS that processes toll free number translation, CCE, and TCS-AS that processes call transfer related functions corresponding to the action of CP calling RP with a toll free number and the subsequent SIP signaling flows in response to the CP call request. The 8YY AS is an AS that performs toll free number to the regular 10 digit North America Numbering Plan (NANP) phone number translation. The TCS-AS is an AS that performs call redirection related functions. Flow 820 to 824 show the signaling flows between TCS-AS, CCE, the BE associated with RP (BE-RP) corresponding to the action of TCS-AS initiating a call request using SIP INVITE message to RP and the subsequent SIP signaling flows in response to the AS INVITE message. Flow 826 to 836 show the signaling flows corresponding to the action of RP indicating that a ringing condition has been initiated at the RP. Flow 838 to 856 show the SIP signaling flows between BE-RP, CCE, and TCS-AS corresponding to the action of RP responding to the TCS-AS INVITE message with a SIP REFER message with the phone number of TP. Flow 858 to 864 and flow 873 to 874 show the signaling flows between TCS-AS, CCE, and the BE associated with TP (BE-TP) corresponding to the action of TCS-AS initiating a call to using SIP INVITE message to TP and the subsequent SIP signaling flows in response to the TCS-AS INVITE message. Flow 865 to 872 show the SIP signaling flows corresponding to the action of TCS-AS canceling RP from the call due to call redirection. Flow 875 to 886 show the signaling flows between TCS-AS, CCE, BE-CP, and BE-TP corresponding to the action of TCS-AS completing the call between CP and TP. In 888, the CP to TP call transfer initiated by RP has been completed and the CP to TP call media path established. Flow 890 to 896 show the SIP signaling flows between BE-RP, CCE, and TCS-AS corresponding to the action of AS indicating to RP that the call transfer has been completed successfully between CP and TP.

Figure 9:
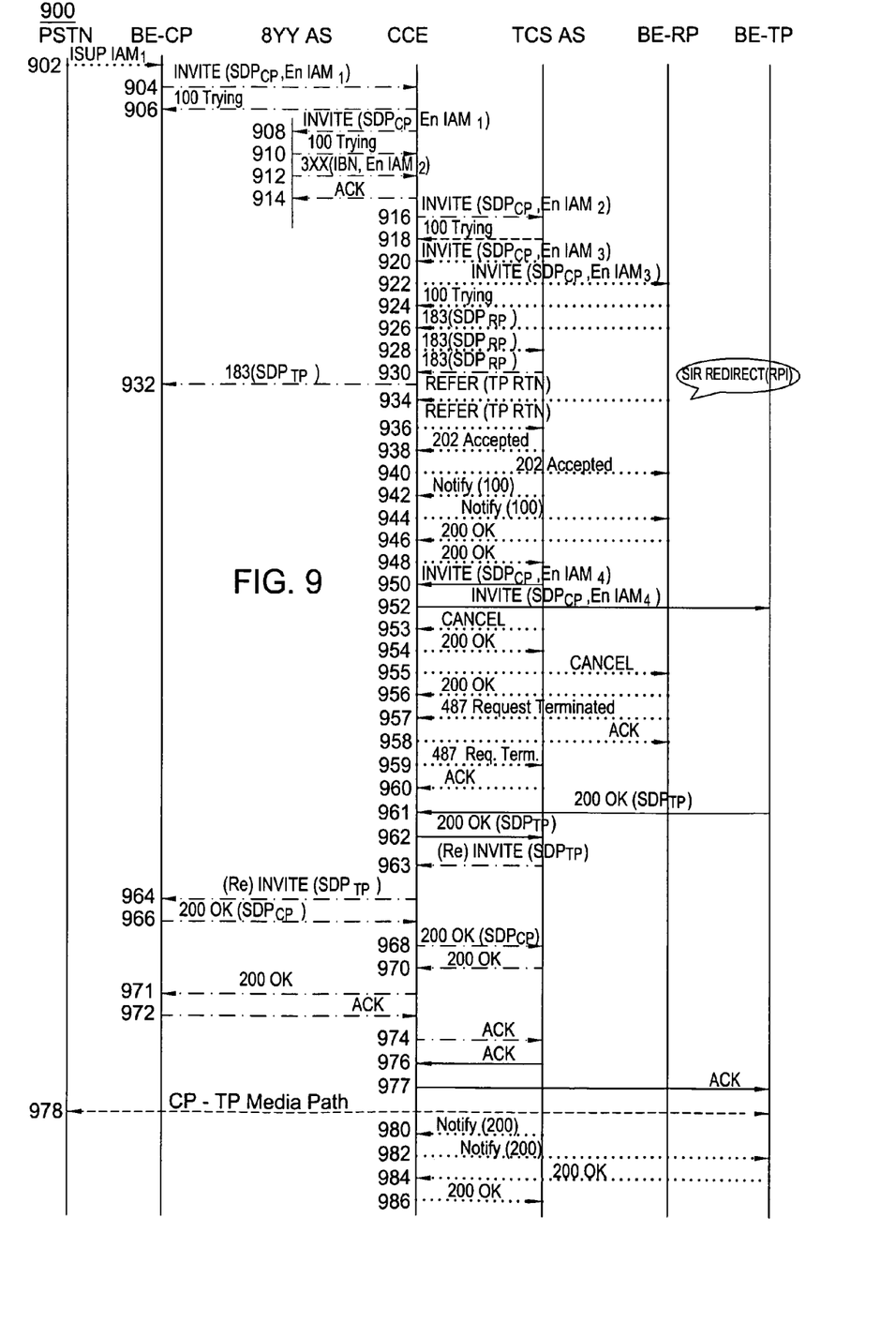
FIG. 9 illustrates the detailed SIP signaling flows within the VoIP network for completing pre-answer call transfer from CP to TP initiated by RP using SIP REFER message in a third embodiment of the present invention.

FIG. 9 illustrates the detailed SIP signaling flow method 900 within the VoIP network for completing pre-answer call transfer from CP to TP initiated by RP using SIP REFER message in a third embodiment of the present invention. In this scenario, the CP will receive no ringing tones from either RP or TP during call processing. The CP call originates in a TDM network and places a call to RP with a toll free number. Flow 902 to 918 and flow 930 to 932 show the SIP signaling flows between the PSTN that originates the CP call, BE-CP, 8YY AS that processes toll free number translation, CCE, and TCS-AS that processes call transfer related functions corresponding to the action of CP calling RP with a toll free number and the subsequent SIP signaling flows in response to the CP call request. The 8YY AS is an AS that performs toll free number to the regular 10 digit North America Numbering Plan (NANP) phone number translation. The TCS-AS is an AS that performs call redirection related functions. Flow 920 to 928 show the signaling flows between TCS-AS, CCE, the BE associated with RP (BE-RP) corresponding to the action of TCS-AS initiating a call request using SIP INVITE message to RP and the subsequent SIP signaling flows in response to the AS INVITE message. Note that no ringing indication is sent to the CP. Flow 934 to 948 show the SIP signaling flows between BE-RP, CCE, and TCS-AS corresponding to the action of RP responding to the TCS-AS INVITE message with a SIP REFER message with the phone number of TP. Flow 950 to 952 and flow 961 to 962 show the signaling flows between TCS-AS, CCE, and the BE associated with TP (BE-TP) corresponding to the action of TCS-AS initiating a call to TP using a SIP INVITE message and the subsequent SIP signaling flows in response to the TCS-AS INVITE message. Flow 953 to 960 show the signaling flows between BE-RP, CCE, and TCS-AS corresponding to the action of TCS-AS canceling RP from the call due to call redirection. Flow 962 to 977 and flow 980 to 986 show the signaling messages between TCS-AS, CCE, BE-CP, and BE-TP corresponding to the action of TCS-AS completing the call between CP and TP. In flow 978, the CP to TP call transfer initiated by RP has been completed and the CP to TP call media path established.

Figure 10:
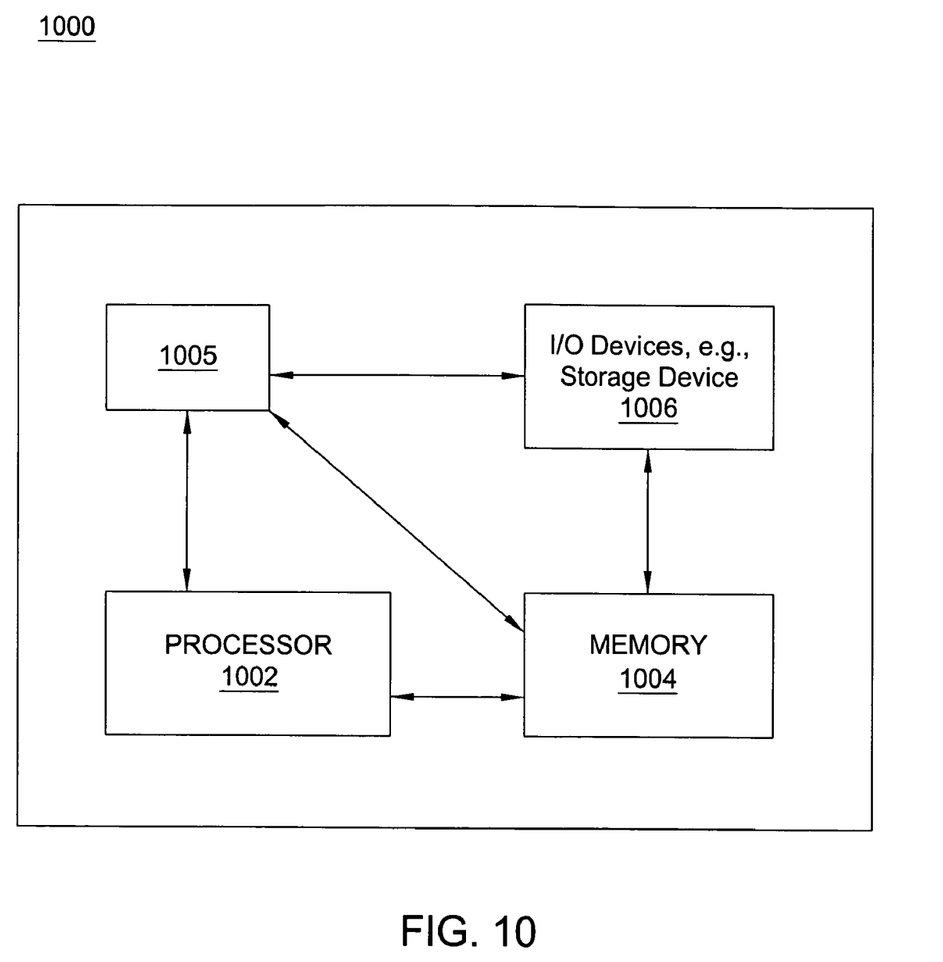
FIG. 10 illustrates a high level block diagram of a general purpose computer suitable for use in performing the functions described herein.

FIG. 10 depicts a high level block diagram of a general purpose computer 1000 suitable for use in performing the functions described herein. As depicted in FIG. 10, the system 1000 comprises a processor element 1002 (e.g., a CPU), a memory 1004, e.g., random access memory (RAM) and/or read only memory (ROM), a call transfer module 1005, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present call transfer module or process 1005 can be loaded into memory 1004 and executed by processor 1002 to implement the functions as discussed above. As such, the present call transfer process 1005 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a call transfer capability in a communication network, comprising:
   receiving a call setup request from a calling party to setup a call to a redirecting party;
   receiving a call transfer request from the redirecting party, where the call transfer request is received by the communication network, where the call transfer request is a call transfer message in accordance with an internet protocol signaling protocol for establishing a call between the calling party and a target party; and
   providing a call transfer of the call to the target party specified by the redirecting party, where the call transfer is performed by the communication network.

2. The method of claim 1, wherein the communication network is a packet network.

3. The method of claim 2, wherein the packet network is an internet protocol network.

4. The method of claim 1, wherein the call transfer is a post-answer call transfer.

5. The method of claim 4, wherein the providing the call transfer for the post-answer call comprises:
   establishing a call media path between the calling party and the redirecting party.

6. The method of claim 5, wherein the internet protocol signaling protocol is a session initiation protocol and the call transfer message is a session initiation protocol refer message containing a phone number of the target party.

7. The method of claim 6, wherein the providing the call transfer comprises:
   placing a call leg between the calling party and a border element associated with the calling party and a call leg between the redirecting party and a border element associated with the redirecting party on hold;
   initiating the call between the calling party and the target party by the communication network; and
   dropping the redirecting party from an existing call using a session initiation protocol bye message.

8. The method of claim 7, wherein the initiating comprises:
   forwarding the session initiation protocol refer message to the border element associated with the calling party by the communication network for the border element associated with the calling party to initiate the call to the target party using a session initiation protocol invite message.

9. The method of claim 1, wherein the call transfer is a pre-answer call transfer.

10. The method of claim 9, wherein the internet protocol signaling protocol is a session initiation protocol.

11. The method of claim 10, wherein the providing the call transfer comprises:
   initiating the call between the calling party and the target party by the communication network; and
   dropping the redirecting party from an existing call using a session initiation protocol cancel message.

12. The method of claim 11, wherein the initiating comprises:
   initiating the call by a transfer call service application server using a session initiation protocol invite message to the target party as a result of a session initiation protocol refer message received by the transfer call service application server.

13. The method of claim 1, wherein the call transfer is a feature subscribed by the redirecting party.

14. A non-transitory computer-readable medium having stored thereon a plurality of instructions, the plurality of instructions including instructions which, when executed by a processor, cause the processor to perform a method for providing a call transfer capability in a communication network, comprising:
   receiving a call setup request from a calling party to setup a call to a redirecting party;
   receiving a call transfer request from the redirecting party, where call transfer request is received by the communication network, where the call transfer request is a call transfer message in accordance with an Internet protocol signaling protocol for establishing a call between the calling party and a target party; and
   providing a call transfer of the call to the target party specified by the redirecting party, where the call transfer is performed by the communication network.

15. The non-transitory computer-readable medium of claim 14, wherein the communication network is a packet network.

16. The non-transitory computer-readable medium of claim 15, wherein the packet network is an internet protocol network.

17. The non-transitory computer-readable medium of claim 14, wherein the call is a post-answer call.

18. The non-transitory computer-readable medium of claim 17, wherein the providing the call transfer for the post-answer call comprises:
   establishing a call media path between the calling party and the redirecting party.

19. The non-transitory computer-readable medium of claim 17, wherein the call transfer request is performed without the redirecting party answering the call.

20. An apparatus for providing a call transfer capability in a communication network, comprising:
   means for receiving a call setup request from a calling party to setup a call to a redirecting party;
   means for receiving a call transfer request from the redirecting party, where the call transfer request is received by the communication network, where the call transfer request is a call transfer message in accordance with an internet protocol signaling protocol for establishing a call between the calling party and a target party; and
   means for providing a call transfer of the call to the target party specified by the redirecting party, where the call transfer is performed by the communication network.

* * * * *